(12) United States Patent
Spurlock et al.

(10) Patent No.: US 11,989,293 B2
(45) Date of Patent: May 21, 2024

(54) SYSTEMS, METHODS, AND MEDIA FOR IDENTIFYING AND RESPONDING TO MALICIOUS FILES HAVING SIMILAR FEATURES

(71) Applicant: McAfee, LLC, San Jose, CA (US)

(72) Inventors: Joel R. Spurlock, Portland, OR (US); Leonardo Frittelli, Cordoba (AR)

(73) Assignee: McAfee, LLC, San Jose, CA (US)

( * ) Notice: Subject to any disclaimer, the term of this patent is extended or adjusted under 35 U.S.C. 154(b) by 329 days.

(21) Appl. No.: 17/195,130

(22) Filed: Mar. 8, 2021

(65) Prior Publication Data

US 2021/0374240 A1     Dec. 2, 2021

Related U.S. Application Data

(63) Continuation of application No. 16/370,328, filed on Mar. 29, 2019, now abandoned.

(Continued)

(51) Int. Cl.
*G06F 21/56*     (2013.01)
*H04L 9/40*     (2022.01)

(52) U.S. Cl.
CPC .......... *G06F 21/565* (2013.01); *G06F 21/567* (2013.01); *H04L 63/14* (2013.01); *H04L 63/145* (2013.01); *G06F 2221/033* (2013.01)

(58) Field of Classification Search
CPC ................. G06F 21/565; G06F 21/567; G06F 2221/033; G06F 21/56; H04L 63/14; H04L 63/145
See application file for complete search history.

(56) References Cited

U.S. PATENT DOCUMENTS 9,998,484 B1 *   6/2018   Buyukkayhan ....... G06F 21/567
2011/0083180 A1     4/2011   Mashevsky et al.
(Continued)

FOREIGN PATENT DOCUMENTS

| KR | 1020150089664 | 8/2015 |
| KR | 1020170107665 | 9/2017 |
| KR | 101880686 | 7/2018 |

OTHER PUBLICATIONS

International Preliminary Report on Patentability dated Apr. 29, 2021 in International Patent Application No. PCT/US2019/054774, pp. 1-7.

(Continued)

*Primary Examiner* — Shanto Abedin
*Assistant Examiner* — Howard H. Louie
(74) *Attorney, Agent, or Firm* — Byrne Poh LLP

(57) ABSTRACT

Systems, methods, and media for identifying and responding to malicious files having similar features are provided. More particularly, in some embodiments, systems for identifying and responding to malicious files having similar features are provided, the systems comprising: a memory; and a hardware processor coupled to the memory and configured to: receive feature information extracted from a file, wherein the feature information includes at least two of static feature information, environmental feature information, and behavioral feature information; create clusters based on the feature information; determine if a file corresponding to one of the clusters is malicious; and report to a plurality of endpoints that other files corresponding to the one of the clusters is malicious.

20 Claims, 7 Drawing Sheets

Related U.S. Application Data

(60) Provisional application No. 62/745,919, filed on Oct. 15, 2018.

(56) References Cited

U.S. PATENT DOCUMENTS

| | | |
|---|---|---|
| 2013/0246352 A1 | 9/2013 | Spurlock et al. |
| 2016/0103992 A1* | 4/2016 | Roundy ............... G06F 21/554 726/23 |
| 2017/0177869 A1 | 6/2017 | Langton et al. |

OTHER PUBLICATIONS

International Search Report and Written Opinion dated Feb. 28, 2020 in International Patent Application No. PCT/US2019/054774, pp. 1-10.

Kornblum, J., "Identifying Almost Identical Files Using Context Triggered Piecewise Hashing", In Proceedings of the Digital Forensic Research Conference, Lafayette, IN, US, Aug. 14-16, 2006, pp. 1-8.

Office Action dated Dec. 7, 2020 in U.S. Appl. No. 16/370,328, pp. 2-13.

* cited by examiner

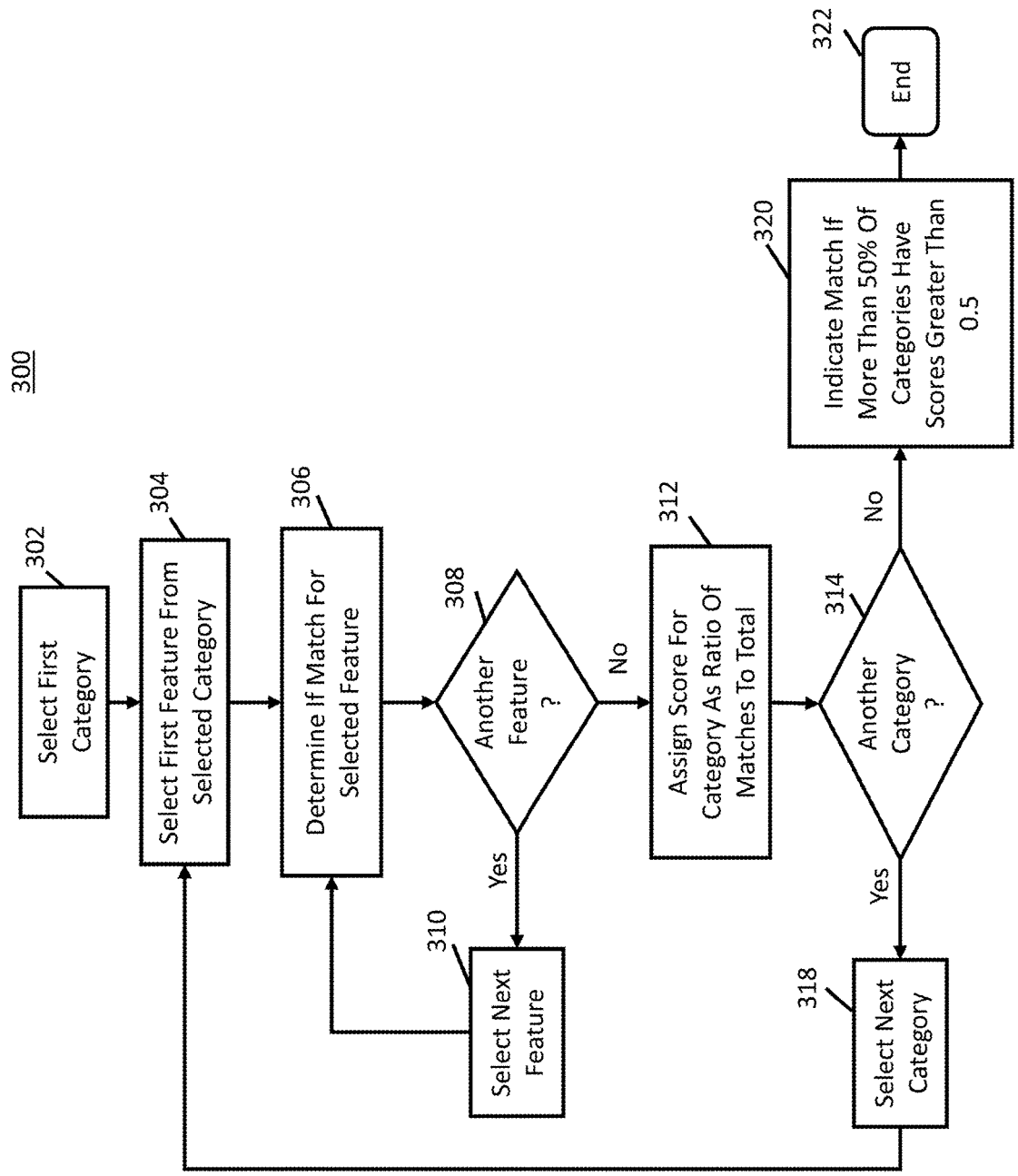

SYSTEMS, METHODS, AND MEDIA FOR IDENTIFYING AND RESPONDING TO MALICIOUS FILES HAVING SIMILAR FEATURES

CROSS REFERENCE TO RELATED APPLICATION

This application is a continuation of U.S. patent application Ser. No. 16/370,328, filed Mar. 29, 2019, which claims the benefit of U.S. Provisional Patent Application No. 62/745,919, filed Oct. 15, 2018, each of which is hereby incorporated by reference herein in its entirety.

BACKGROUND

Malicious computer files are frequently modified in order to evade detection by anti-virus and anti-intrusion software and systems. Modifications can include instruction reordering, instruction virtualization, file encryption or packing, dynamic recompilation, appending data to the end of the file, and a variety of other techniques.

It is desirable to provide new mechanisms for identifying and responding to malicious files having similar features.

SUMMARY

In accordance with some embodiments, systems, methods, and media for identifying and responding to malicious files having similar features are provided. More particularly, in some embodiments, systems for identifying and responding to malicious files having similar features are provided, the systems comprising: a memory; and a hardware processor coupled to the memory and configured to: receive feature information extracted from a file, wherein the feature information includes at least two of static feature information, environmental feature information, and behavioral feature information; create clusters based on the feature information; determine if a file corresponding to one of the clusters is malicious; and report to a plurality of endpoints that other files corresponding to the one of the clusters is malicious.

In some embodiments, methods for identifying and responding to malicious files having similar features are provided, the methods comprising: receiving, at a hardware processor, feature information extracted from a file, wherein the feature information includes at least two of static feature information, environmental feature information, and behavioral feature information; creating, using the hardware processor, clusters based on the feature information; determining, using the hardware processor, if a file corresponding to one of the clusters is malicious; and reporting to a plurality of endpoints that other files corresponding to the one of the clusters is malicious.

In some embodiments, non-transitory computer-readable media containing computer-executable instructions that, when executed by a processor, cause the processor to perform a method for identifying and responding to malicious files having similar features are provided, the method comprising: receiving feature information extracted from a file, wherein the feature information includes at least two of static feature information, environmental feature information, and behavioral feature information; creating clusters based on the feature information; determining if a file corresponding to one of the clusters is malicious; and reporting to a plurality of endpoints that other files corresponding to the one of the clusters is malicious.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3 shows an example of a process for determining whether extracted feature information for a file matches reference feature information for a reference object (e.g., which can be a reference existing cluster or a reference file) in accordance with some embodiments.

DETAILED DESCRIPTION

In accordance with some embodiments, mechanisms (which can include systems, methods, and media) for identifying and responding to malicious files having similar features are provided. By using the techniques described herein, mechanism can identify a malicious file and warn endpoints having similar, but not identical files, that those files may be malicious too.

In some embodiments, these mechanisms can extract features information from a file (e.g., as described in connection with FIG. 1), create clusters of files based on the extracted feature information (e.g., as described in connection with FIGS. 2A, 2B, and 3), determine if a file is malicious (e.g., as described in connection with FIG. 4), and report that other files in a corresponding cluster may be malicious so that appropriate action can be taken (e.g., as described in connection with FIG. 4).

Figure 1:
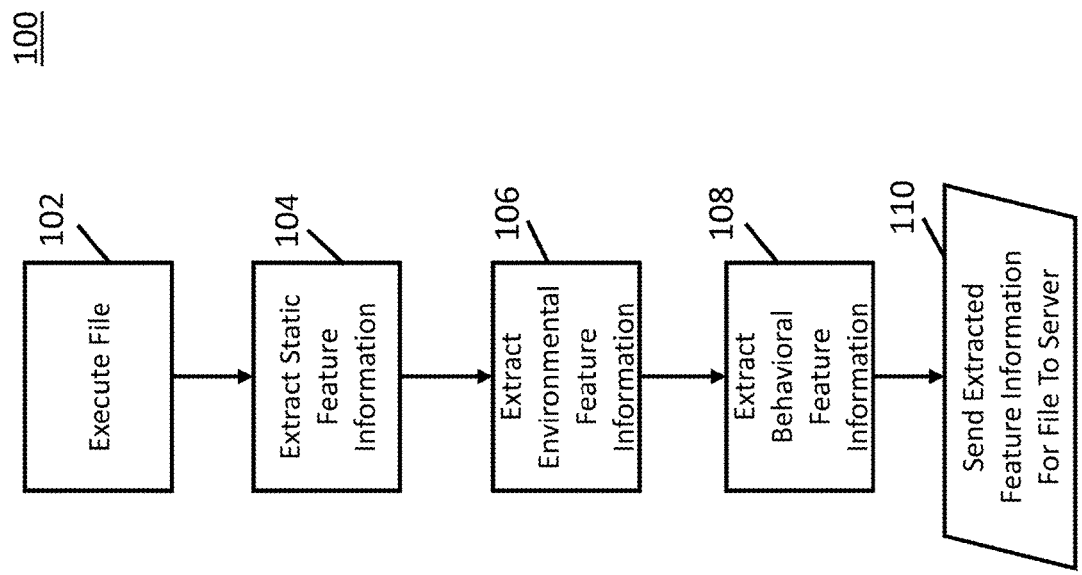
FIG. 1 shows an example of a process for extracting and sending feature information from a file from an endpoint to a server in accordance with some embodiments.

Turning to FIG. 1, an example of a process 100 for extracting and sending feature information for a file in accordance with some embodiments is shown. Process 100 can be performed by any suitable device and in any suitable manner in some embodiments. For example, in some embodiments, process 100 can be performed by an endpoint, such as an endpoint as illustrated in and described in connection with FIGS. 5 and 6 below. As another example, process 100 can be performed in response to a file being received at an endpoint, in response to a file being selected by a user of an endpoint, in response to a file being scanned by a security application on an endpoint, and/or in response to any other event, and multiple instances of process 100 may be performed in order to process multiple files at the same time, or about the same time, in some embodiments.

As illustrated, process 100 can begin by executing a file at 102. In some embodiments, any suitable file type can be executed and the file can be executed in any suitable manner. For example, in some embodiments, the file can be a Microsoft Windows operating system (or any other operating system) executable file that is executed by a Microsoft Windows operating system (or any other operating system). As another example, in some embodiments, the file can be a script file that is executed by a suitable script interpreter. As still another example, in some embodiments, the file can be a media file that is executed by a suitable media player. In some embodiments, the file can be executed in a secure environment, such as a sandbox or virtual machine.

Next, at 104, static feature information can be extracted. In some embodiments, any suitable static feature information can be extracted and the static feature information can be extracted in any suitable manner. For example, static feature information can include information that describes the contents of the file. More particularly, for example, in some embodiments, static feature information can include information such as a size of the file, a description of one or more overlays in the file, a geometry of the file, resources used by file, application programming interfaces (APIs) used by the file, entropy of portions of the file, sections of code executed by the file, libraries imported or referenced by the file, strings embedded in the file, anything else that can be statically derived from the file, and/or any other suitable information that describes the contents of a file.

Then, at 106, environmental feature information can be extracted. In some embodiments, any suitable environmental feature information can be extracted and the environmental feature information can be extracted in any suitable manner. For example, environmental feature information can include information that describes how the file is installed and executed on a device. More particularly, for example, in some embodiments, environmental feature information can include information that identifies a path from which the file is executed, that identifies a parent process of the file, that indicates that the file is installed as a service, that indicates that the file has an uninstaller registered for the same path, that indicates that the file has a run key or other automated execution condition, that indicates that the file is registered as a shell extension, that indicates the file's age in the environment, that indicates the file's prevalence in the environment, that indicates whether or not any short cuts reference the file, that indicates what operating system the file is configured to run in, and/or any other suitable information that describes how the file is installed and executed on a device.

Next, at 108, behavioral feature information can be extracted. In some embodiments, any suitable behavioral feature information can be extracted and the behavioral feature information can be extracted in any suitable manner. For example, behavioral feature information can include information that describes observable outcomes of executing the file. More particularly, for example, in some embodiments, behavioral feature information can include information that indicates that the file, when executed, connects to external URLs, creates certain files, disables a firewall or one or more features of a firewall, opens up ports for listening, interacts with other processes, registry, or files, executes with a certain frequency, requires a certain user security level or integrity level when executed, installs WMI provider, and/or any other suitable information that describes observable outcomes of executing the file.

Finally, at 110, the extracted feature information for the file can be sent to a server for further processing as described below in connection with FIG. 2. The extracted feature information can be sent to the server in any suitable manner in some embodiments. For example, in some embodiments, the extracted feature information can be sent as three vectors: (1) a static feature information vector; (2) an environmental feature information vector; and (3) a behavioral feature information vector. Each of these vectors can reflect the feature information corresponding to the vector in some embodiments. For example, in some embodiments, a static feature information vector can describe information such as a size of the file, a description of one or more overlays in the file, a geometry of the file, resources used by file, application programming interfaces (APIs) used by the file, entropy of portions of the file, sections of code executed by the file, libraries imported or referenced by the file, strings embedded in the file, anything else that can be statically derived from the file, and/or any other suitable information that describes the contents of a file. As another example, in some embodiments, an environmental feature information vector can describe information that identifies a path from which the file is executed, that identifies a parent process of the file, that indicates that the file is installed as a service, that indicates that the file has an uninstaller registered for the same path, that indicates that the file has a run key or other automated execution condition, that indicates that the file is registered as a shell extension, that indicates the file's age in the environment, that indicates the file's prevalence in the environment, that indicates whether or not any short cuts reference the file, that indicates what operating system the file is configured to run in, and/or any other suitable information that describes how the file is installed and executed on a device. As still another example, in some embodiments, a behavioral feature information vector can describe information that indicates that the file, when executed, connects to external URLs, creates certain files, disables a firewall or one or more features of a firewall, opens up ports for listening, interacts with other processes, registry, or files, executes with a certain frequency, requires a certain user security level or integrity level when executed, installs WMI provider, and/or any other suitable information that describes observable outcomes of executing the file.

Figure 2A:
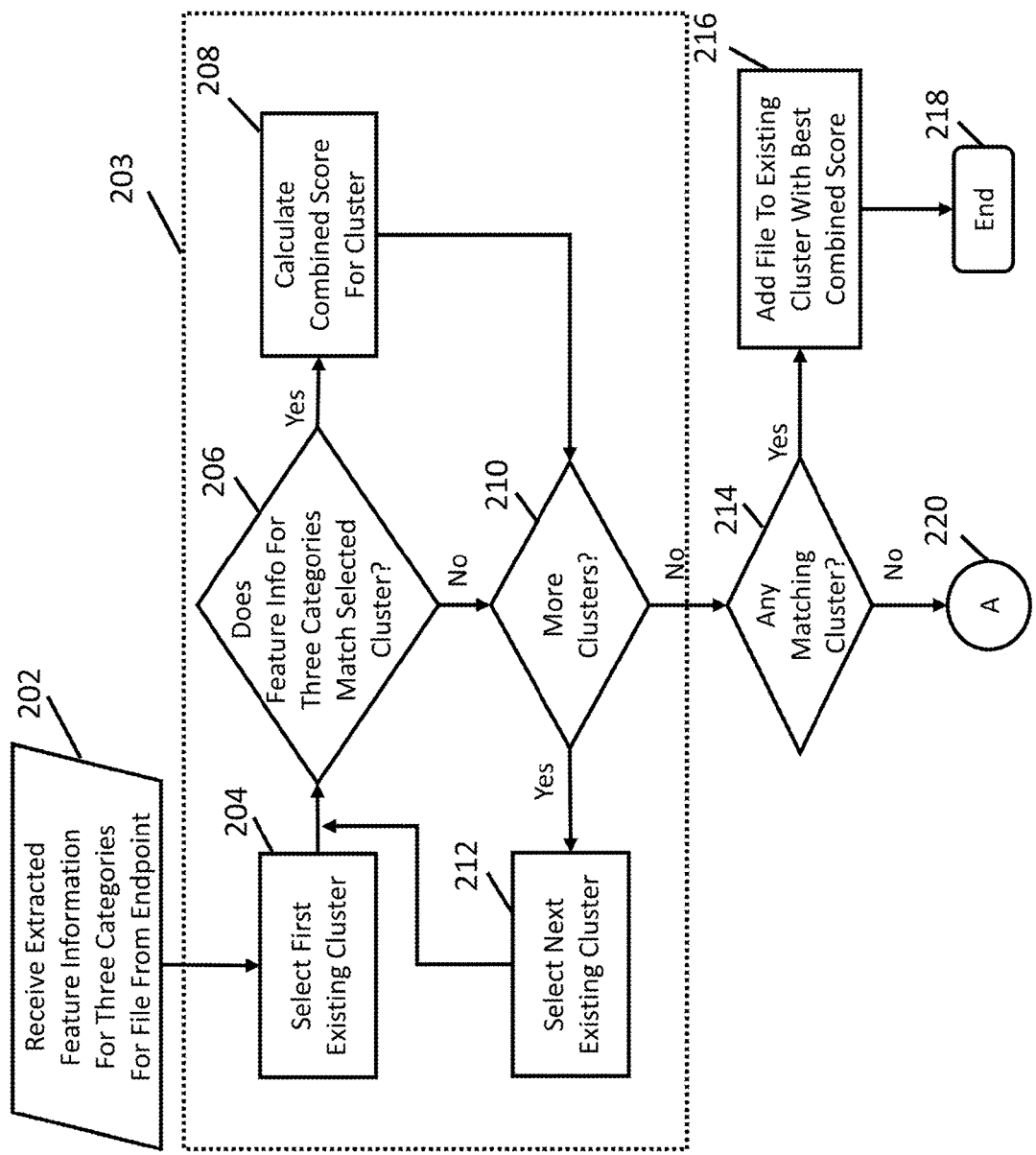
FIGS. 2A and 2B show an example of a process for creating clusters of files and adding files to existing clusters of files in accordance with some embodiments.
Figure 2B:
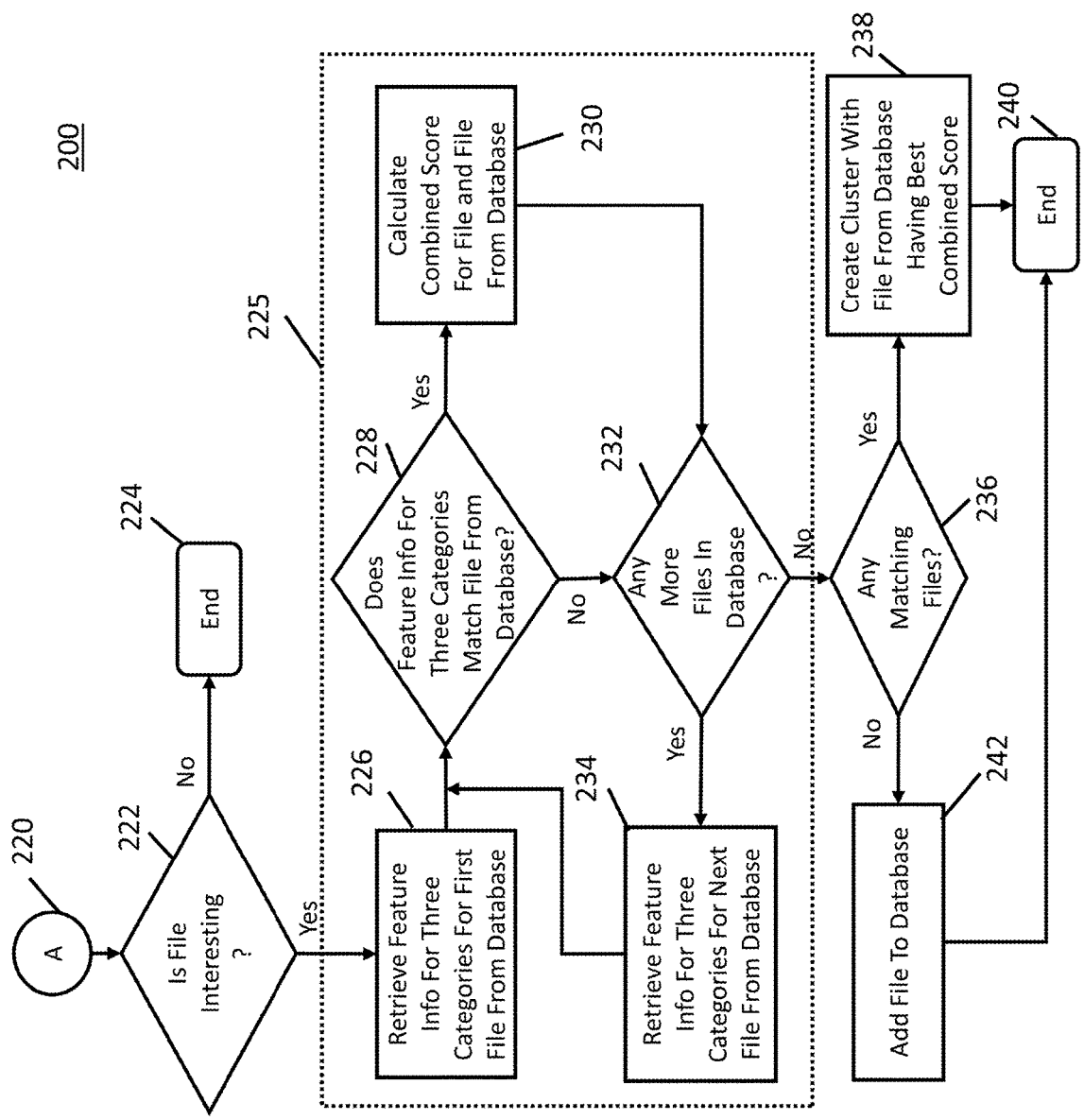

Turning to FIGS. 2A and 2B, an example of a process 200 for creating clusters of files and adding files to existing clusters of files in accordance with some embodiments is shown. Process 200 can be performed by any suitable device and in any suitable manner in some embodiments. For example, in some embodiments, process 200 can be performed by a server, such as a server as illustrated in and described in connection with FIGS. 5 and 6 below. As another example, process 200 can be performed in response to extracted feature information being made available to a given device, such as a server, and multiple instances of process 200 may be performed in order to process extracted feature information being received at the same time, or about the same time, at a server.

As illustrated in FIG. 2A, process 200 begins by receiving extracted feature information for a file from an endpoint. The extracted feature information for the file can be received in any suitable manner in some embodiments. For example, as described in connection with block 110 of FIG. 1, in some embodiments, the extracted feature information can be sent as three vectors: (1) a static feature information vector; (2) an environmental feature information vector; and (3) a behavioral feature information vector.

Next, at 204, process 200 can select the first cluster to check the file against. This cluster can be selected in any suitable manner. For example, a most recently created cluster can be selected as the first cluster, a cluster with the most members can be selected as the first cluster, etc.

Then, at 206, process 200 can determine whether the extracted feature information for the file matches the selected existing cluster. This determination can be made in any suitable manner in some embodiments. For example, in some embodiments, process 200 can determine whether the extracted feature information for a file matches the selected existing cluster by determining a mathematical distance (which can be calculated in any suitable manner) for each category of the extracted feature information for the file and the extracted feature information representing the selected existing cluster, and determining if a combined distance of the determined mathematic distances for the categories is less than a threshold (which can be any suitable threshold). As another example, process 200 can determine whether the extracted feature information for the file matches an existing cluster using the process illustrated in FIG. 3.

Turning to FIG. 3, an example 300 of a process for determining whether extracted feature information for a file matches reference feature information for a reference object (e.g., which can be a reference existing cluster or a reference file) is illustrated in accordance with some embodiments. As shown, process 300 begins by selecting a first category among the categories of feature information for the file at 302. Any suitable category can be selected as the first category. For example, the static feature information can be selected as the first category of feature information in some embodiments. As another example, the environmental feature information can be selected as the first category of feature information in some embodiments. As yet another example, the behavioral feature information can be selected as the first category of feature information in some embodiments.

Next, at 304, process 200 can select the first feature from the selected category. Any suitable feature can be selected as the first feature.

Then, at 306, process 300 can determine if there is a match between the value of the selected feature of the file and the value of the selected feature of the reference object (e.g., an existing cluster or a file). Process 400 can determine if there is a match between the values in any suitable manner. For example, for some features, a match may only exist when the values are identical. More particularly, for example, if a value is binary, then both values may be required to be true or false for a match to exist. As another example, for some features, a match may exist when the values are the same or within a certain percentage of each other. More particularly, for example, if values are continuous, a match may exist when the values are within 10% (or any other suitable percentage) of the larger value (e.g., values 90 and 100 would match because 90 is within 10% of 100).

At 308, process 300 can determine if there is another feature in the selected category. If there is, then process 300 can branch to 310 at which it can select the next feature and the loop back to 306. Otherwise, if there is not another feature in the selected category, then process 300 can branch to 312 at which it can assign a score for the category as a ratio of the matched features to the total features. For example, if a category has ten features and six match, a score of 0.6 can be assigned to the category.

Next, at 314, process 300 can determine if there is another category. If so, process 300 can select the next category at 318 and loop back to 304. Otherwise, process 300 can indicate a match between the file and the reference object (e.g., an existing cluster or a file) if more than 50% (or any other suitable percentage) of the categories have scores greater than 0.5 (or any other suitable value) at 320 and then end at 322.

Referring back to process 200 shown in FIG. 2, if a match is determined at 206, then process 200 can calculate a combined score for the cluster at 208. This combined score can be calculated in any suitable manner. For example, in some embodiments, the combined score for the cluster can be set equal to a combined mathematical distance based on calculated mathematical distances of each category of features between the file and the selected cluster. As another example, in some embodiments, the combined score the cluster can be a weighted combination of the scores for each category. More particularly, for example, the combined score (CS) can be:

$$CS = W_S * S_S + W_E * S_E + W_B * S_B$$

where:
  $W_S$ is the weight for the static category;
  $S_S$ is the score for the static category;
  $W_E$ is the weight for the environmental category;
  $S_E$ is the score for the environmental category;
  $W_B$ is the weight for the behavioral category;
  $S_B$ is the score for the behavioral category; and
  $W_S + W_E + W_B = 1$.

If no match is determined at 206 or after calculating a combined score at 208, process 200 can determine if there are more clusters to check at 210. If there are more clusters to check, then process 200 can branch to 212 at which the next cluster can be selected and then loop back to 206. Otherwise, if process determines that there are no more clusters at 210, then process 200 can branch to 214 at which the process can determine if there are any matching clusters. If there are matching clusters, then process 200 can add the file to the matching existing cluster with the best combined score at 216 and then end at 218. Otherwise, if there are no matching clusters, process 200 can branch via 220 to 222 of FIG. 2B.

A file can be added to an existing cluster at 216 in any suitable manner. For example, in some embodiments, the name of the file, the location of the file (e.g., IP address), the extracted feature information for the file, and/or any other suitable information can be stored in a database in association with the cluster. As another example, in some embodiments, feature information associated with the cluster (e.g., that can be used to determine whether extracted feature information of one or more files matches the cluster at 206) can be updated using the extracted feature of the file. More particularly, for each feature of each category, a cluster can be assigned values that reflect the median, mean, or most common values for those features of each category (based on the nature of the feature) so that assigned values can be compared to future files to determine if the future file matches the cluster.

At 222 of FIG. 2B, process 200 can determine if the file is interesting. This can be performed in any suitable manner. For example, in some embodiments, a file may be determined to be interesting if the file, when executed, exhibits behavior that is anomalous (e.g., by performing actions that similar files do not do). As another example, a file may be determined to be interesting if it comes from an external source, a less-trusted process (e.g., an email client, a browser, etc.), etc., is packed, is low prevalence, etc.

If the file is determined to not be interesting at 222, then process 200 can end at 224.

Otherwise, if the file is determined to be interesting at 222, then process 200 can proceed to 226, at which it can retrieve feature information for a first non-clustered file from a database. Any suitable non-clustered file can be selected as the first non-clustered file. For example, in some embodiments, the first non-clustered can be randomly selected from a group of recent non-clustered files (e.g., file in the last 24 hours) or can be selected as the most recent non-clustered file.

Then, at 228, process 200 can determine whether the extracted feature information for the file matches the feature information for the selected file from the database. This determination can be made in any suitable manner in some embodiments. For example, in some embodiments, process 200 can determine whether the extracted feature information for a file matches the selected file from the database by determining a mathematical distance (which can be calculated in any suitable manner) for each category of the extracted feature information for the file and the extracted feature information representing the selected file from the database, and determining if a combined distance of the determined mathematic distances for the categories is less than a threshold (which can be any suitable threshold). As another example, process 200 can determine whether the extracted feature information for the file matches the selected file from the database using the process illustrated in FIG. 3 and as described above.

If a match is determined at 228, then process 200 can calculate a combined score for the file from the database at 230. This combined score can be calculated in any suitable manner. For example, in some embodiments, the combined score for the file from the database can be set equal to a combined mathematical distance based on calculated mathematical distances of each category of features between the file and the file from the database. As another example, in some embodiments, the combined score the file from the database can be a weighted combination of the scores for each category. More particularly, for example, the combined score (CS) can be:

$$CS = W_S * S_S + W_E * S_E + W_B * S_B$$

where:
$W_S$ is the weight for the static category;
$S_S$ is the score for the static category;
$W_E$ is the weight for the environmental category;
$S_E$ is the score for the environmental category;
$W_B$ is the weight for the behavioral category;
$S_B$ is the score for the behavioral category; and
$W_S + W_E + W_B = 1$.

If no match is determined at 228 or after calculating a combined score at 230, process 200 can determine if there are more files to check at 232. If there are more files to check, then process 200 can branch to 234 at which the feature information for the next file from the database can be retrieved and process 200 can then loop back to 228. Otherwise, if process determines that there are no more files to check at 232, then process 200 can branch to 236 at which the process can determine if there are any matching files. If there are matching files, then process 200 can create a cluster with the file and the file from the database having the best score at 238. Otherwise, if there are no matching files from the database, process 200 can branch to 242 at which it can add the file to the database at 242 and then end at 240.

A cluster can be created at 238 in any suitable manner. For example, in some embodiments, the name of the files, the location of the files (e.g., IP addresses), the extracted feature information for the files, and/or any other suitable information can be stored in a database in association with the cluster. As another example, in some embodiments, feature information associated with the cluster (e.g., that can be used to determine whether extracted feature information of one or more files matches the cluster at 206) can be created using the extracted feature of the file.

While specific examples of techniques for identifying matching clusters and matching files from a database are provided and described in connection with the blocks in areas 203 and 225 of FIGS. 2A and 2B, it should be apparent that other mechanisms can be used as well. For example, in some embodiments, a nearest neighbor search can be used to identify a matching cluster or a match file in some embodiments.

Figure 4:
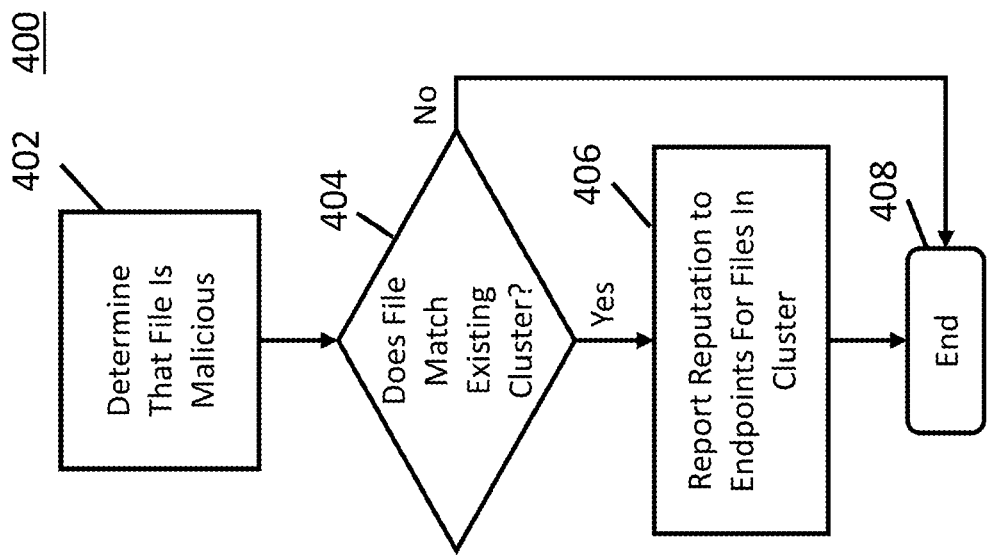
FIG. 4 shows an example of a process for processing a malicious file (or a file that is otherwise of concern) in accordance with some embodiments.

Turning to FIG. 4, an example 400 of a process for processing a malicious file (or a file that is otherwise of concern) is illustrated. Process 400 can be performed by any suitable device and in any suitable manner in some embodiments. For example, in some embodiments, process 400 can be performed by a server, such as a server as illustrated in and described in connection with FIGS. 5 and 6 below. As another example, process 400 can be performed in response to a server detecting a malicious file or the server being informed about a malicious file from an endpoint.

As shown, at 402, process 400 can determine that a file is malicious or otherwise of concern. This can be performed in any suitable manner. Next, at 404, process 200 can determine if the file matches an existing cluster. This can be performed in any suitable manner. For example, static, environmental, and behavioral feature information for the file can be extracted (e.g., as described above in connection with 104, 106, and 108 of FIG. 1) and a match between the malicious file and an existing cluster can be found (e.g., as described above in connection with 204, 206, 208, 210, 212, 214, and 216 of FIG. 2A). If a match is determined to exist at 404, then, at 406, process 400 can report the reputation of the malicious file to endpoints indicated as having the files in the matching cluster. In response to this, the endpoints can then take any suitable action such as quarantining the files in the matching cluster. Finally, after reporting the reputation at 406 or determining that no matching existing cluster exists at 404, process 400 can end at 408.

Figure 5:
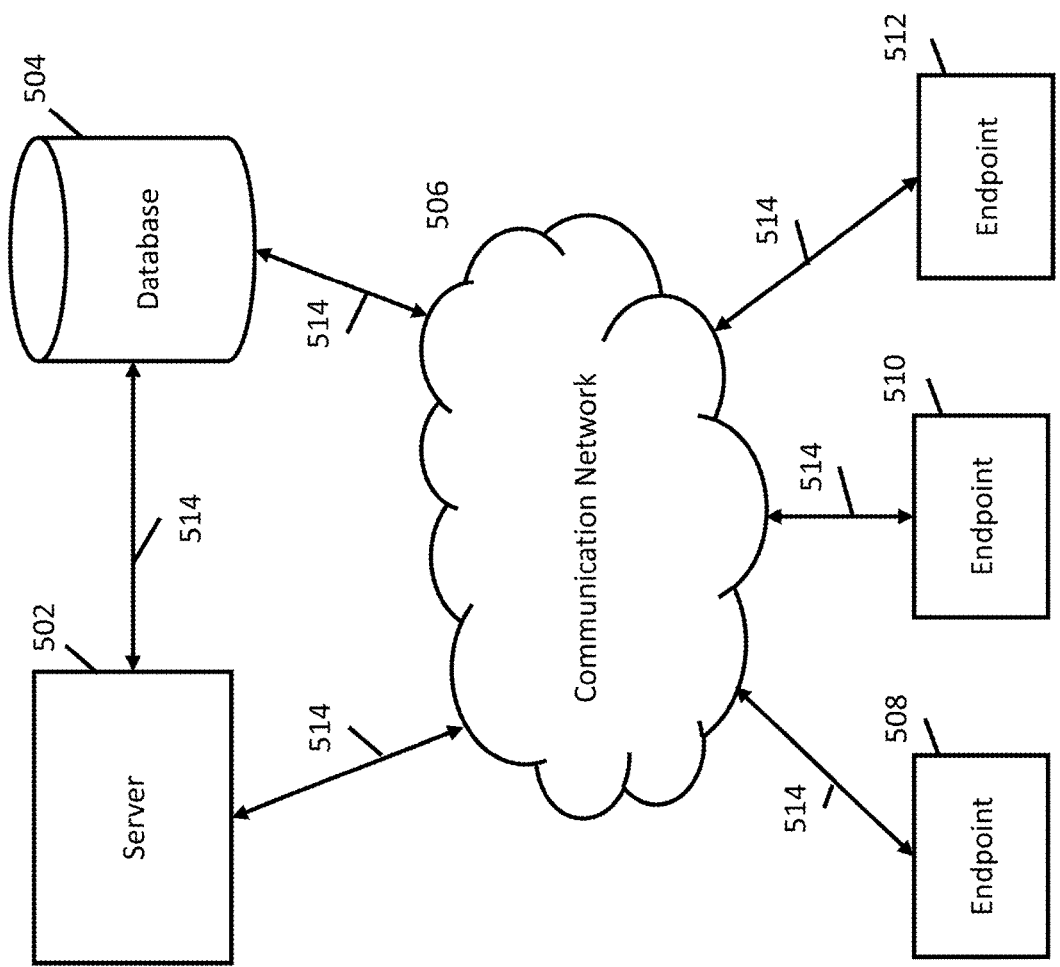
FIG. 5 shows an example of hardware in accordance with some embodiments.
Figure 6:
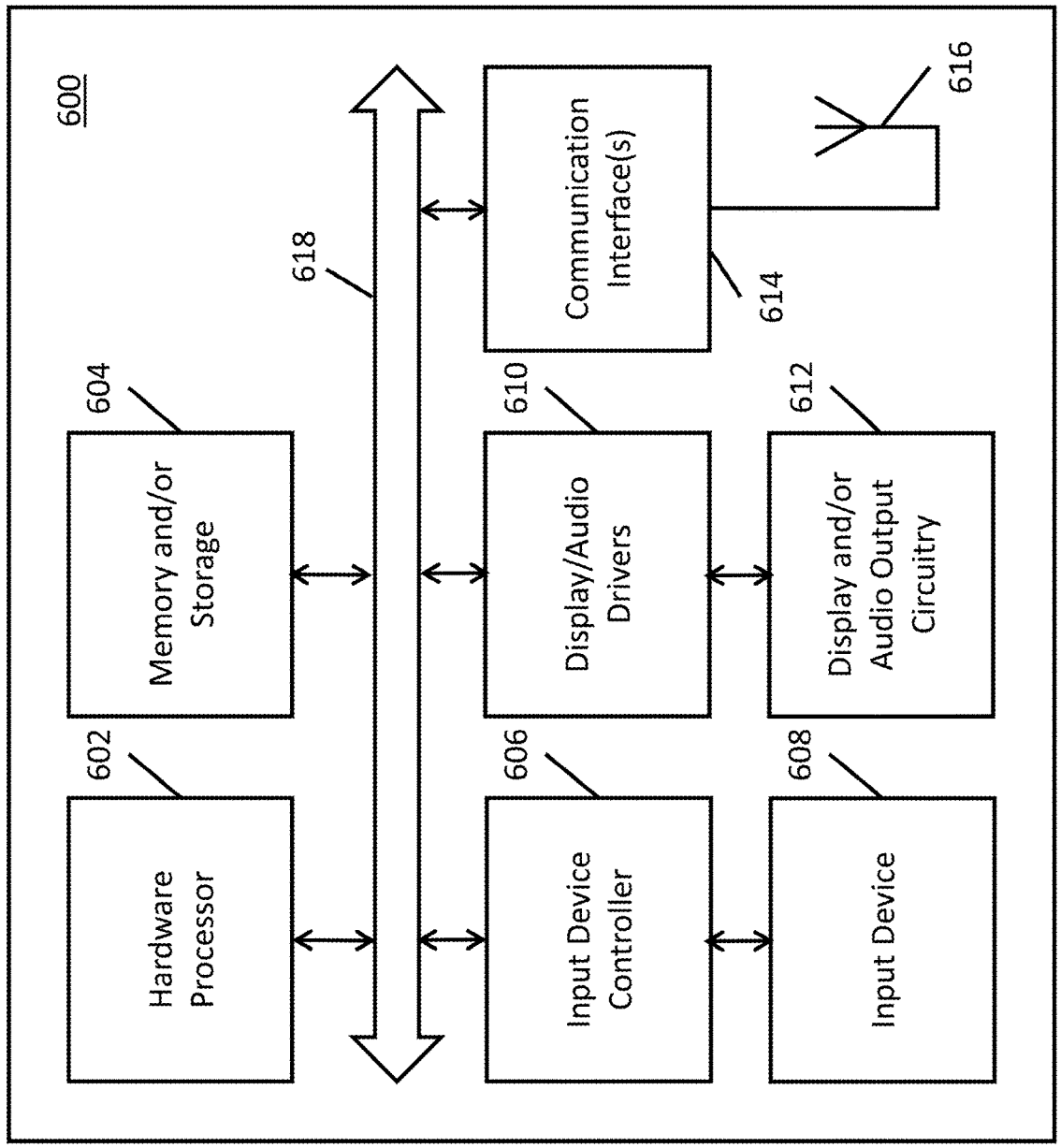
FIG. 6 shows an example of more specific hardware that can be used to implement some components of FIG. 5 in accordance with some embodiments.

Turning to FIG. 5, an example 500 of hardware that can be used in accordance with some embodiments of the disclosed subject matter is shown. As illustrated, hardware 500 can include a server 502, a database 504, a communication network 506, and/or one or more endpoints 508, 510, and 512.

Server 502 can be any suitable server(s) for performing the functions described in connection with FIGS. 2A, 2B, 3, and 4, and/or any other suitable functions.

Database 504 can be any suitable database for storing information, such as the database information described above in connection with FIG. 2B.

Communication network 506 can be any suitable combination of one or more wired and/or wireless networks in some embodiments. For example, communication network 506 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), BLUETOOTH, BLUETOOTH LE, and/or any other suitable communication network.

In some embodiments, server 502, database 504, communication network 506, and/or one or more endpoints 508, 510, and 512 can be interconnected any suitable links 514, such as network links, dial-up links, wireless links, hard-wired links, any other suitable communications links, or any suitable combination of such links.

Endpoints 508, 510, and 512 can include any suitable endpoints. For example, in some embodiments, the endpoints can include desktop computers, laptop computers, tablet computers, mobile phones, Internet of Things (IoT) devices (such as smart thermostats, smart home devices (e.g., an alarm clock, an electric toothbrush, a scale, a lock, a VoIP phone, and/or any other suitable home device), smart personal assistants, smart exercise machines, smart appliances (e.g., lighting systems, kitchen appliances, washer, dryers, fire alarms, spray systems, and/or any other suitable appliances), smart media systems (e.g., a television, a speaker, a streaming media device, a virtual assistant device, and/or any other suitable media device), smart computing devices (e.g., a printer, a computer, a network router, and/or any other suitable computing device), smart HVAC systems, smart security systems, etc.) and/or any other suitable device capable of connecting to a network to transmit and receive data.

Although server 502 and database 504 are each illustrated as one device, the functions performed by device(s) 502 and 504 can be performed using any suitable number of devices in some embodiments. For example, in some embodiments, multiple devices can be used to implement the functions performed by each device(s) 502 and 504. Similarly, although device 502 and 504 are illustrated as being separate, in some embodiments, these devices can be integrated.

Although three endpoints 508, 510, and 512 are shown in FIG. 5 to avoid over-complicating the figure, any suitable number of endpoints, and/or any suitable types of endpoints, can be used in some embodiments.

Server 502, database 504, and endpoints 508, 510, and 512 can be implemented using any suitable hardware in some embodiments. For example, in some embodiments, devices 502, 504, 508, 510, and 512 can be implemented using any suitable general-purpose computer or special-purpose computer. For example, an endpoint which is a mobile phone can be implemented using a special-purpose computer. Any such general-purpose computer or special-purpose computer can include any suitable hardware. For example, as illustrated in example hardware 600 of FIG. 6, such hardware can include hardware processor 602, memory and/or storage 604, an input device controller 606, an input device 608, display/audio drivers 610, display and audio output circuitry 612, communication interface(s) 614, an antenna 616, and a bus 618.

Hardware processor 602 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 602 can be controlled by a program stored in memory and/or storage 604.

Memory and/or storage 604 can be any suitable memory and/or storage for storing programs, data, and/or any other suitable information in some embodiments. For example, memory and/or storage 604 can include random access memory, read-only memory, flash memory, hard disk storage, optical media, and/or any other suitable memory.

Input device controller 606 can be any suitable circuitry for controlling and receiving input from one or more input devices 608 in some embodiments. For example, input device controller 606 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 610 can be any suitable circuitry for controlling and driving output to one or more display/audio output devices 612 in some embodiments. For example, display/audio drivers 610 can be circuitry for driving a touchscreen, a flat-panel display, a cathode ray tube display, a projector, a speaker or speakers, and/or any other suitable display and/or presentation devices.

Communication interface(s) 614 can be any suitable circuitry for interfacing with one or more communication networks (e.g., communication network 506). For example, interface(s) 614 can include network interface card circuitry, wireless communication circuitry, and/or any other suitable type of communication network circuitry.

Antenna 616 can be any suitable one or more antennas for wirelessly communicating with a communication network (e.g., communication network 506) in some embodiments. In some embodiments, antenna 616 can be omitted.

Bus 618 can be any suitable mechanism for communicating between two or more components 602, 604, 606, 610, and 614 in some embodiments.

Any other suitable components can be included in hardware 600 in accordance with some embodiments.

In some embodiments, at least some of the above described blocks of the processes of FIGS. 1, 2A, 2B, 3, and 4 can be executed or performed in any order or sequence not limited to the order and sequence shown in and described in connection with the figures. Also, some of the above blocks of FIGS. 1, 2A, 2B, 3, and 4 can be executed or performed substantially simultaneously where appropriate or in parallel to reduce latency and processing times. Additionally or alternatively, some of the above described blocks of the processes of FIGS. 1, 2A, 2B, 3, and 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A system for identifying and responding to malicious files having similar features, comprising:
   a memory; and a hardware processor coupled to the memory and configured to:
receive feature information extracted from a file, wherein the feature information includes at least two of static feature information, environmental feature information, and behavioral feature information;
for each cluster of a plurality of clusters of files:
for a first portion of the feature information corresponding to one of the static feature information, the environmental feature information, and the behavioral feature information:
determine a first number of features in the first portion of the feature information that match the cluster; and
determine a first score based on a ratio of the first number of features and a total number of features in the first portion of the feature information;
for a second portion of the feature information corresponding to another of the static feature information, the environmental feature information, and the behavioral feature information:
determine a second number of features in the second portion of the feature information that match the cluster; and
determine a second score based on a ratio of the second number of features and a total number of features in the second portion of the feature information; and
determine a combined score for the cluster based on a combination of at least the first score and the second score, wherein the combined score is one of a plurality of combined scores;
identify one of the plurality of clusters with a best of the plurality of combined scores as matching the file;
determine that the file is malicious; and
report to a plurality of endpoints that other files corresponding to the one of the plurality of clusters is malicious.

2. The system of claim 1, wherein the feature information includes the static feature information, and the static feature information includes information that describes contents of the file.

3. The system of claim 2, wherein the static feature information includes at least one of a size of the file, a description of one or more overlays in the file, a geometry of the file, resources used by the file, application programming interfaces (APIs) used by the file, entropy of portions of the file, sections of code executed by the file, libraries imported or referenced by the file, and strings embedded in the file.

4. The system of claim 1, wherein the feature information includes the environmental feature information, and the environmental feature information includes information that describes how the file is installed and executed on a device.

5. The system of claim 4, wherein the environmental feature information includes at least one of information that identifies a path from which the file is executed, information that identifies a parent process of the file, information that indicates that the file is installed as a service, information that indicates that the file has an uninstaller registered for a same path, information that indicates that the file has a run key or other automated execution condition, information that indicates that the file is registered as a shell extension, information that indicates the file's age in the environment, information that indicates the file's prevalence in the environment, information that indicates whether or not any short cuts reference the file, and information that indicates what operating system the file is configured to run in.

6. The system of claim 1, wherein the feature information includes the behavioral feature information, and the behavioral feature information includes information that describes observable outcomes of executing the file.

7. The system of claim 6, wherein the behavioral feature information includes information that indicates that the file, when executed, does at least one of: connects to external URLs, creates certain files, disables a firewall or one or more features of a firewall, opens up ports for listening, interacts with other processes, registry, or files, executes with a certain frequency, requires a certain user security level or integrity level when executed, and installs a Windows Management Instrumentation (WMI) provider.

8. A method for identifying and responding to malicious files having similar features, comprising:
receiving, at a hardware processor, feature information extracted from a file, wherein the feature information includes at least two of static feature information, environmental feature information, and behavioral feature information;
for each cluster of a plurality of clusters of files:
for a first portion of the feature information corresponding to one of the static feature information, the environmental feature information, and the behavioral feature information:
determining a first number of features in the first portion of the feature information that match the cluster; and
determining a first score based on a ratio of the first number of features and a total number of features in the first portion of the feature information;
for a second portion of the feature information corresponding to another of the static feature information, the environmental feature information, and the behavioral feature information:
determining a second number of features in the second portion of the feature information that match the cluster; and
determining a second score based on a ratio of the second number of features and a total number of features in the second portion of the feature information; and
determining a combined score for the cluster based on a combination of at least the first score and the second score, wherein the combined score is one of a plurality of combined scores;
identifying one of the plurality of clusters with a best of the plurality of combined scores as matching the file;
determining, using the hardware processor, that the file is malicious; and
reporting to a plurality of endpoints that other files corresponding to the one of the plurality of clusters is malicious.

9. The method of claim 8, wherein the feature information includes the static feature information, and the static feature information includes information that describes contents of the file.

10. The method of claim 9, wherein the static feature information includes at least one of a size of the file, a description of one or more overlays in the file, a geometry of the file, resources used by the file, application programming interfaces (APIs) used by the file, entropy of portions of the file, sections of code executed by the file, libraries imported or referenced by the file, and strings embedded in the file.

11. The method of claim 8, wherein the feature information includes the environmental feature information, and the environmental feature information includes information that describes how the file is installed and executed on a device.

12. The method of claim 11, wherein the environmental feature information includes at least one of information that identifies a path from which the file is executed, information that identifies a parent process of the file, information that indicates that the file is installed as a service, information that indicates that the file has an uninstaller registered for a same path, information that indicates that the file has a run key or other automated execution condition, information that indicates that the file is registered as a shell extension, information that indicates the file's age in the environment, information that indicates the file's prevalence in the environment, information that indicates whether or not any short cuts reference the file, and information that indicates what operating system the file is configured to run in.

13. The method of claim 8, wherein the feature information includes the behavioral feature information, and the behavioral feature information includes information that describes observable outcomes of executing the file.

14. The method of claim 13, wherein the behavioral feature information includes information that indicates that the file, when executed, does at least one of: connects to external URLs, creates certain files, disables a firewall or one or more features of a firewall, opens up ports for listening, interacts with other processes, registry, or files, executes with a certain frequency, requires a certain user security level or integrity level when executed, and installs a Windows Management Instrumentation (WMI) provider.

15. A non-transitory computer-readable medium containing computer-executable instructions that, when executed by a processor, cause the processor to perform a method for identifying and responding to malicious files having similar features, the method comprising:
    receiving feature information extracted from a file, wherein the feature information includes at least two of static feature information, environmental feature information, and behavioral feature information;
    for each cluster of a plurality of clusters of files:
        for a first portion of the feature information corresponding to one of the static feature information, the environmental feature information, and the behavioral feature information:
            determining a first number of features in the first portion of the feature information that match the cluster; and
            determining a first score based on a ratio of the first number of features and a total number of features in the first portion of the feature information;
        for a second portion of the feature information corresponding to another of the static feature information, the environmental feature information, and the behavioral feature information:
            determining a second number of features in the second portion of the feature information that match the cluster; and
            determining a second score based on a ratio of the second number of features and a total number of features in the second portion of the feature information; and
            determining a combined score for the cluster based on a combination of at least the first score and the second score, wherein the combined score is one of a plurality of combined scores;
    identifying one of the plurality of clusters with a best of the plurality of combined scores as matching the file;
    determining that the file is malicious; and
    reporting to a plurality of endpoints that other files corresponding to the one of the plurality of clusters is malicious.

16. The non-transitory computer-readable medium of claim 15, wherein the feature information includes the static feature information, and the static feature information includes information that describes contents of the file.

17. The non-transitory computer-readable medium of claim 16, wherein the static feature information includes at least one of a size of the file, a description of one or more overlays in the file, a geometry of the file, resources used by the file, application programming interfaces (APIs) used by the file, entropy of portions of the file, sections of code executed by the file, libraries imported or referenced by the file, and strings embedded in the file.

18. The non-transitory computer-readable medium of claim 15, wherein the feature information includes the environmental feature information, and the environmental feature information includes information that describes how the file is installed and executed on a device.

19. The non-transitory computer-readable medium of claim 18, wherein the environmental feature information includes at least one of information that identifies a path from which the file is executed, information that identifies a parent process of the file, information that indicates that the file is installed as a service, information that indicates that the file has an uninstaller registered for a same path, information that indicates that the file has a run key or other automated execution condition, information that indicates that the file is registered as a shell extension, information that indicates the file's age in the environment, information that indicates the file's prevalence in the environment, information that indicates whether or not any short cuts reference the file, and information that indicates what operating system the file is configured to run in.

20. The non-transitory computer-readable medium of claim 15, wherein the feature information includes the behavioral feature information, and the behavioral feature information includes information that describes observable outcomes of executing the file.

* * * * *